(No Model.)
M. G. HUBBARD.
CAR TRUCK.
No. 326,653. Patented Sept. 22, 1885.
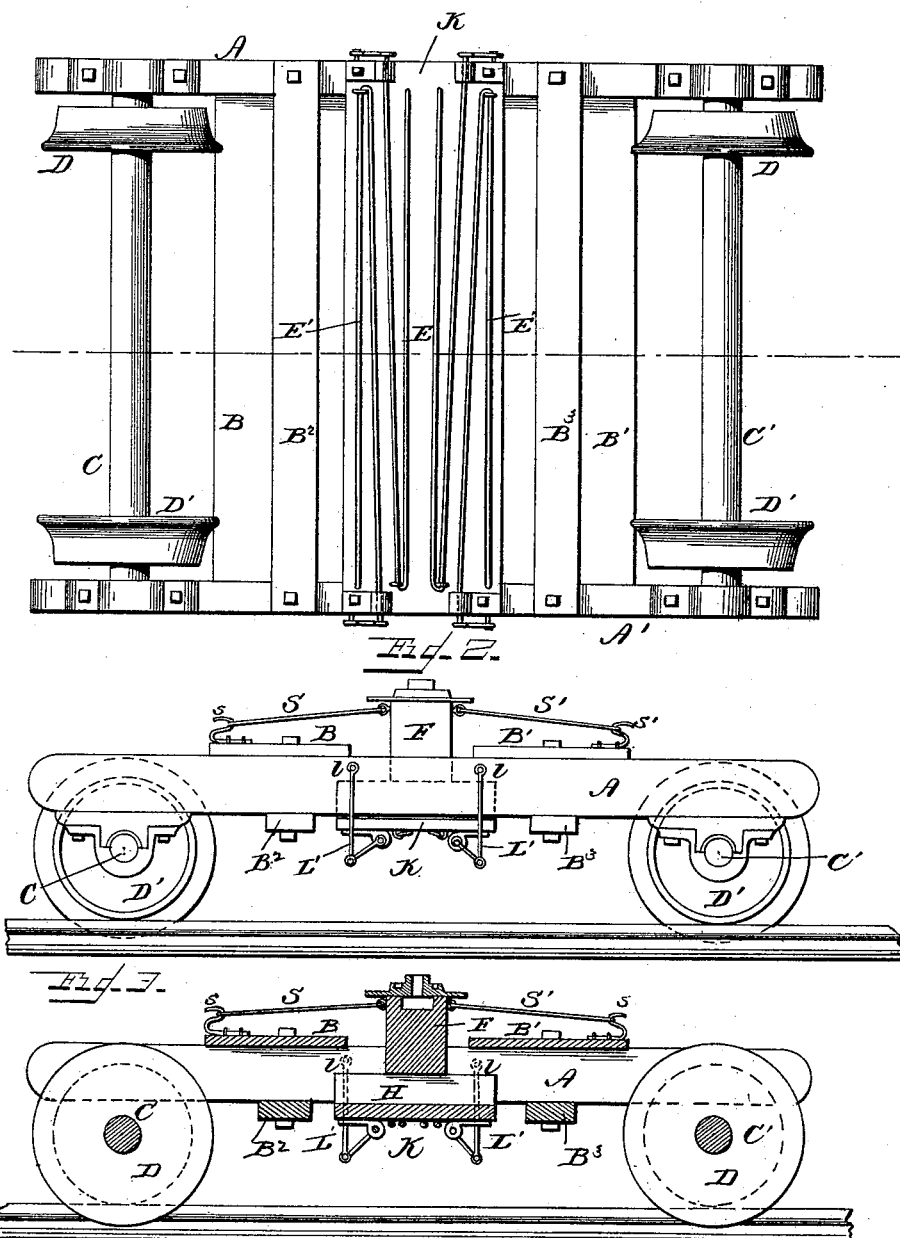
WITNESSES
INVENTOR
M. G. Hubbard
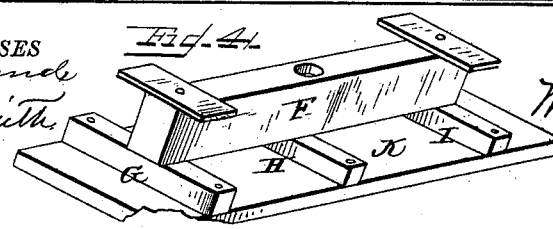
Attorney

UNITED STATES PATENT OFFICE.

MOSES G. HUBBARD, OF NORRISTOWN, PENNSYLVANIA.

CAR-TRUCK.

SPECIFICATION forming part of Letters Patent No. 326,653, dated September 22, 1885.

Application filed November 17, 1884. (No model.)

*To all whom it may concern:*

Be it known that I, MOSES G. HUBBARD, of Norristown, county of Montgomery, and State of Pennsylvania, have invented a new and useful Improvement in Car-Trucks, of which the following is a full, clear, and exact description, reference being had to the accompanying drawings, making part of this specification.

My invention relates to the construction and arrangement of the truck to better adapt it to my torsion or circumferential springs, and to give it a horizontal flexibility sufficient, when the journal-boxes have a fixed attachment to the truck-frame, to keep all the wheels in contact with the track while passing ordinary inequalities, and to give the frame an increased diagonal stiffness and strength. I find it desirable to make the springs as long as possible in order to increase their capacity, and to attach their sustaining-links on the outer sides of the truck-frame for greater convenience. To adapt the truck-frame to all of these purposes, I employ side sills of ordinary proportions, but the cross-sills I make much wider and thinner than the cross-sills of an ordinary truck, and bolt them flatwise securely to the upper and lower edges of the side sills. By this form of cross-sills I attain a sufficient horizontal flexibility of the truck, while sustaining the weight of the car on its long frictionless springs, to keep all of its wheels in contact with the rails by the instantaneous and unobstructed action of the springs, and I also add an extraordinary degree of diagonal stiffness and strength to the truck-frame. For convenience in arranging the other parts of the truck I employ a much wider cross-sill on the upper edge than on the under edge of the side-sills, located and arranged as shown in the accompanying drawings, which form a part of this specification, and in which—

Figure 1 is a bottom view of a car-truck with my improvements applied; Fig. 2, a side elevation; Fig. 3, a vertical longitudinal section on the line $x$ $x$, Fig. 1; and Fig. 4 a bolster detached.

A A' represent the side longitudinal sills of the truck-frame, to the ends of which, on their lower faces, are secured the boxes $a$ $a'$, in which the axles C and C' are mounted; B B', wide and flat transverse bars or sills secured to the upper sides or edges of the longitudinal sills between the axles, and $B^2$ $B^3$ similar but narrower transverse bars or sills secured to the lower faces of the longitudinal sills underneath the sills B and B'.

D and D' indicate the wheels, secured to the axles in any usual or preferred manner.

F is the bolster, through which the car-body is united to the truck by means of a central pivot or king-bolt, said bolster being arranged between the cross-sills B and B' and secured to the upper faces of short longitudinally-arranged bars G, H, and I, which rest upon and are secured to the platform K, to the under side of which are secured the long U-shaped or recurved torsional or circumferential supporting springs E E', under an arrangement similar to that described and shown in my pending application, filed September 5, 1884, Serial No. 142,302. The platform K extends underneath the side sills, and the crank-arms $e$ on the outer free ends of the springs E and E' vibrate in vertical planes outside of the outer faces of said sills, and are connected to pendent swinging links L L', the upper ends of which are pivoted at $l$ in any suitable manner to the outer sides of the sills B and B', at or near their upper edges, thereby bringing said links outside of the truck and truck-wheels, as shown. By thus extending the spring-platform K and the springs to the outer sides of the sills the platform is made to serve to limit the upward movement of the bolster, and increased length of springs is secured as compared with the construction described in my former application referred to, in which the platform and springs are shown as terminating inside of the side longitudinal sills—an important feature where torsional or circumferential springs are employed. The bolster is provided on its upper face, at or near its ends, with short longitudinally-arranged blocks or plates, the ends of which overhang the cross-sills B and B' and serve to limit the downward movement of the bolster, and the latter is connected by draft-links S S' with suitable elastic standard-brackets, $s$ $s'$, attached to the sills B and B' or other suitable points on the truck-frame.

By constructing the truck-frame in the form shown and described I am enabled to sustain the bolster on the three supporting-pieces G, H, and I, which rest on the spring-platform K, the bolster and said supporting-pieces and spring-platform being all securely bolted together.

It is important to attain the best form of truck in order to keep all of the wheels in contact with the rails while passing inequalities of the track.

In ordinary passenger-car trucks the journal-box of each wheel is given a certain amount of vertical freedom in the truck-brackets, and the car and truck are sustained by coil or rubber springs located under and near the center of the side sills of the truck and resting upon equalizing-bars, which rest upon the journal-boxes, and thus sustain the car. The object of this vertical freedom of the journal-box is to permit the springs between the truck and the equalizing-bars to force the wheels down into depressions or allow them to pass ordinary inequalities of the rail.

It is obvious that gravitation alone will not act quickly enough to overcome the forward momentum of the wheel and draw it down into ordinary depressions of the rail, and the action of the spring is relied upon to quicken its downward movement; but as the entire draft of the train is drawing the brackets against these journal-boxes with great force, the freedom of their vertical movement if not wholly destroyed is greatly impaired by the resulting friction between the journal-boxes and the brackets, and this friction acting at so great a distance from the spring has a corresponding leverage upon it, and the effect in retarding the action of the spring is thereby greatly increased. Therefore the desired instantaneous action of the springs to force the wheels into depressions in the rails is practically prevented to such an extent that the forward momentum of the wheels at the customary speed of the train would cause them to advance several feet before they would drop an inch, and hence one of the principal objects of the equalizing-bars is defeated. To overcome this imperfection, I prefer to attach the journal-boxes directly to the sills of the truck, and attain the desired vertical freedom of the wheels by means of the horizontal flexibility of the truck. The form of construction above shown and described is one of the best for attaining this result.

The composition semicircular portion of the journal-box, which rests upon the axle, should be so attached as to be readily removed when sufficiently worn, and a new one substituted in the ordinary manner.

The point of draft on the bolster may be kept in proper forward and backward position by my "car-truck draft-links," (which are more fully described in my pending application, Serial No. 142,302, above referred to.) A pair of such links may be used at each end of the bolster, or one pair in the center, as shown, may be used to act in combination with the free vertical "spring-sustaining links," to permit a slight rotary movement of the bolster in a horizontal plane around the king-bolt, for the purpose of attaining greater freedom of the truck to conform to curves in the track when the car is swayed over onto the end bearing on the end of the bolster, allowing the end of the bolster to conform to the position of the car and the truck to move slightly in relation to the bolster without sliding on its end support.

The truck in its general arrangement of parts, and except in features hereinbefore particularly specified, resembles that described in my former application referred to; but in said application the truck-frame is made rigid or inflexible, and the circumferential springs terminate between the vertical longitudinal planes of the side sills thereof, and are therefore necessarily short and stiff as compared with the arrangement herein shown and described.

Having now described my invention, I claim as new—

1. A truck-frame composed of rigid side sills and the wide and thin transverse bars connecting said sills, whereby the desired vertical freedom of the wheels and greatly increased diagonal stiffness of the frame are attained, substantially as described.

2. The combination, in a truck-frame, of the rigid side sills, the axle-boxes having a rigid connection therewith, and the wide and thin transverse bars connecting said side sills and located between the wheels for giving compactness, vertical flexibility, and diagonal stiffness to the truck-frame, substantially as described.

3. The combination, with the flexible truck-frame, of the short pedestals, the centrally-located springs, and the yielding-bolster on which the car-body rests, substantially as described.

4. The combination, with the flexible truck-frame, of the centrally-located springs, the yielding-bolster, and the anti-friction draft-links, substantially as described.

5. In a car-truck, the bolster supported on transversely-arranged circumferential springs suspended from the truck-frame by means of pivoted links located outside of the truck-frame, whereby greatly-increased length of spring is attained, substantially as described.

6. A car-truck bolster pivoted to the truck at its center by means of the draft-links, in combination with the pendent links supporting it, substantially as described.

In testimony whereof I have hereunto set my hand this 10th day of September, A. D. 1884.

MOSES G. HUBBARD.

Witnesses:
JAS. W. SCHRACK,
WM. H. RAMEY.